May 25, 1937.  J. G. EDMUNDSON ET AL  2,081,270
ROTARY ENGINE
Filed April 27, 1936    2 Sheets-Sheet 1
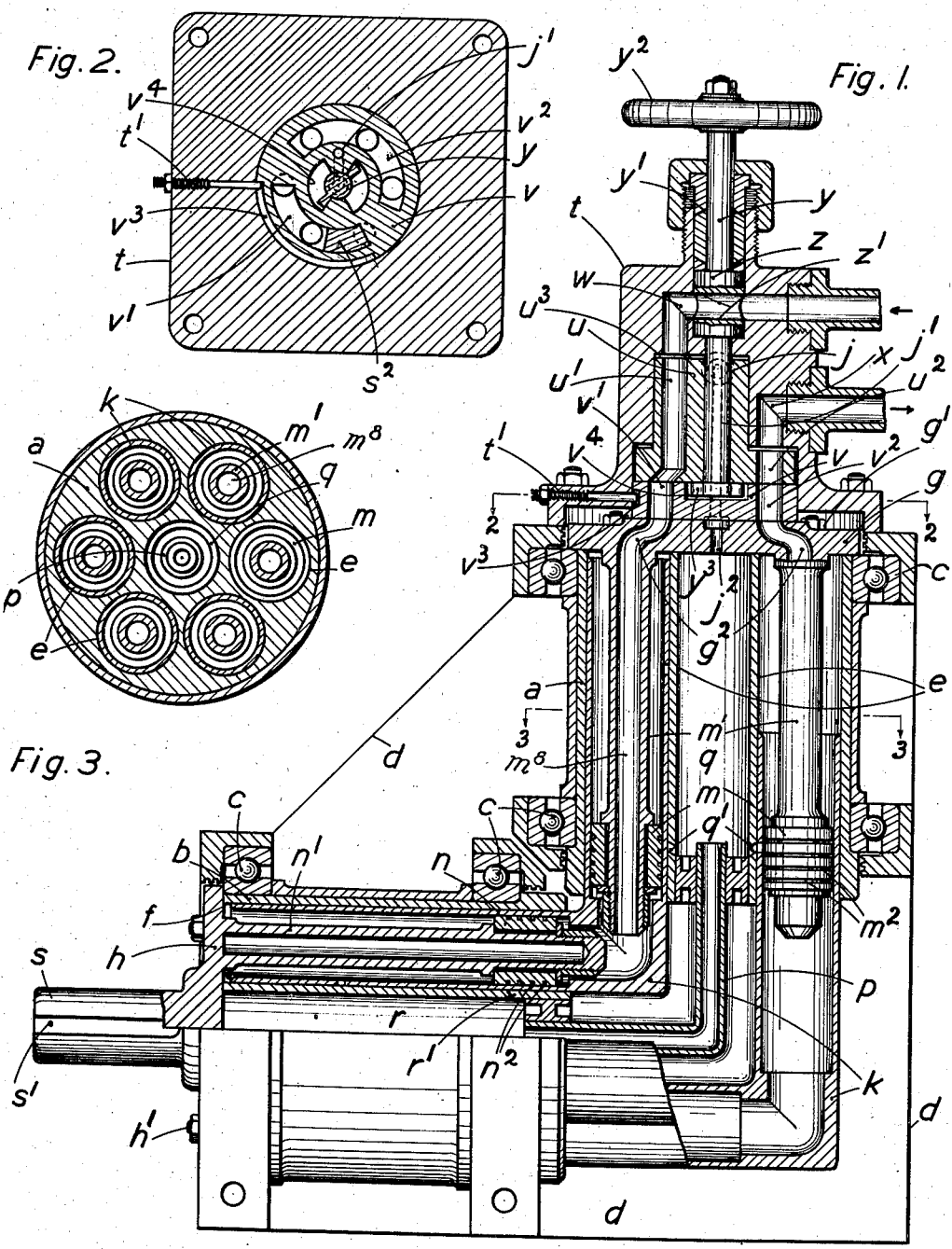
John G. Edmundson
John B. Taylor
INVENTORS
BY Toulmin & Toulmin,
ATTORNEYS.

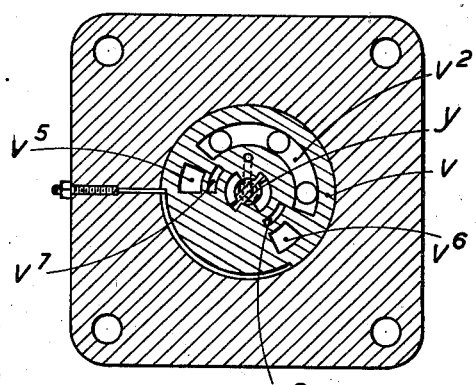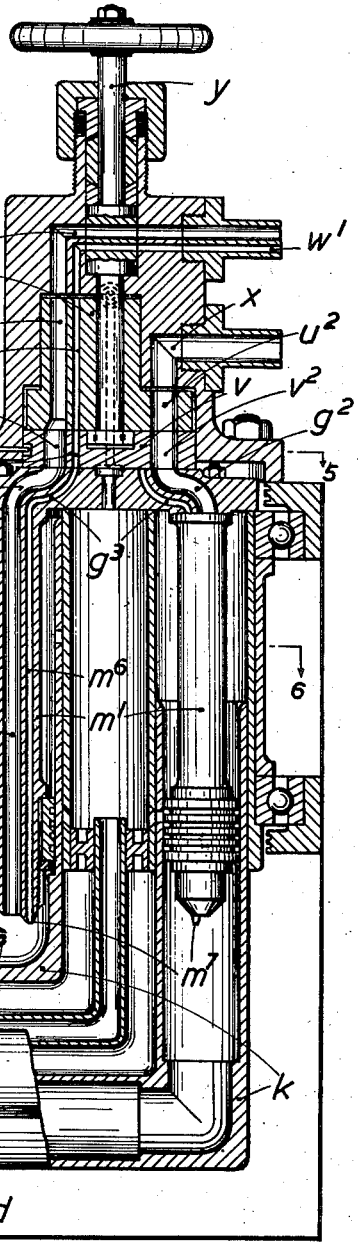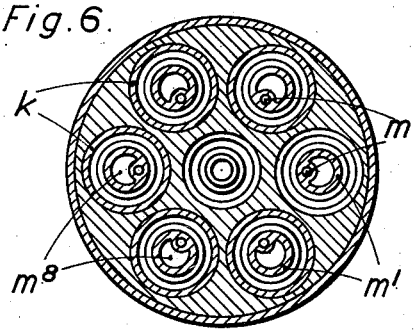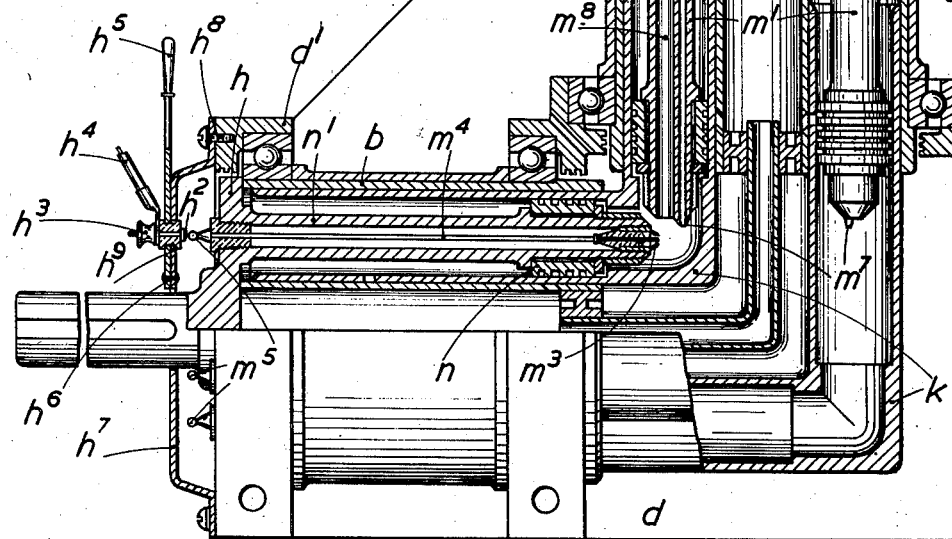

Patented May 25, 1937

2,081,270

UNITED STATES PATENT OFFICE 2,081,270

ROTARY ENGINE

John George Edmundson and John Beaumont Taylor, Monkseaton, England

Application April 27, 1936, Serial No. 76,508
In Great Britain May 2, 1935

5 Claims. (Cl. 121—62)

This invention relates to improvements in rotary engines, and has for its primary object the provision of an improved rotary engine capable of use as a motor, as a compressor for air or other fluid or as a pump.

With this and other objects in view, as will appear as the description proceeds, the invention consists in the novel features of construction and combinations and arrangements of parts hereinafter fully described and set out in the appended claims.

The accompanying drawings illustrate rotary engines in accordance with our invention. In the drawings, Figure 1 is a sectional plan of an engine in which the working fluid is steam or compressed air;

Figure 2 is a section on the line 2—2 in Fig. 1;

Figure 3 is a section on the line 3—3 in Fig. 1;

Figure 4 is a sectional plan of an engine in which internal combustion of the working fluid occurs;

Figure 5 is a section on the line 5—5 in Fig. 4; and

Figure 6 is a section on the line 6—6 in Fig. 4.

Referring to the said drawings, in the example illustrated in Figs. 1, 2 and 3, the engine has two rotors $a$, $b$ with their axes at right angles, each rotor being mounted in bearings $c$ carried by a base plate $d$ so as to rotate freely about its axis. The bearings $c$ may be of ball type as shown, or they may be of roller, slipper or plain type, if desired, and the base plate $d$ may support a casing or housing to enclose the rotors. Six parallel cylindrical chambers $e$, $f$ respectively are regularly spaced around the axis of each rotor, the adjacent ends of said chambers being open while their remote ends are closed by end plates $g$, $h$ respectively secured by bolts $g^1$, $h^1$ screwed into the solid portions of the rotors between the chambers. Six right-angled cylinders $k$ are provided, the opposite ends of said cylinders projecting into said chambers $e$, $f$ respectively. Pistons $m$, $n$ are provided in the ends of the cylinders, said pistons being self-aligning and being supported by rigidly fixed hollow piston rods $m^1$, $n^1$ projecting from the end plates $g$, $h$ with which they are integral. The pistons are grooved as shown at $m^2$, $n^2$ to pick up and carry lubricant. The pistons revolve with the rotors $a$, $b$ but are relatively stationary, while the cylinders $k$ couple the rotors together and slide into and out of the chambers $e$, $f$.

A right-angled tube $p$ connects central chambers $q$, $r$ of the two rotors and serves to convey lubricant from one chamber to the other. The end plate $h$ of the rotor $b$ is provided with an integral shaft $s$ having a keyway $s^1$ to receive a gear wheel, pulley or other device for transmitting the rotary power of the engine.

The hollow piston rods $n^1$ of the rotor $b$ are closed at both ends but the hollow piston rods $m^1$ of the rotor $a$ are open at their inner ends, and at their outer ends the axial passages $m^8$ in said rods are continued by ports $g^2$ in the end plate $g$ so that said rods serve to convey working fluid to and from the working spaces of the cylinders $k$ between the opposed pistons $m$, $n$.

Co-acting with the outer face of the end plate $g$ of the rotor $a$ is a valve comprising a stationary cylindrical body $t$ fitted internally with a piston $u$ abutting against an angularly-adjustable disc valve $v$ which bears on said end plate and has a pair of oppositely-positioned segmental ports $v^1$, $v^2$ communicating with the ports $g^2$ in the end plate. Pressure fluid is admitted through a lateral port $w$ in the valve body $t$ to a port $u^1$ in the piston which leads from a space $u^3$ behind said piston to the port $v^1$ in the disc valve, and the exhaust is led from the port $v^2$ in the disc valve through a second port $u^2$ in the piston to a lateral exhaust port $x$ in the valve body. A slipper block $s^2$ is provided in the inlet port $v^1$ in the disc valve, said block being shaped to fit closely the curved walls and top and bottom of said port but being free to slide from one end to the other of said port to alter the point of cut-off of the working fluid to the cylinders according to the direction of rotation. The length of the block $s^2$ is determined by the amount of cut-off required. The block is automatically forced from one end to the other of the port $v^1$ by the entry of the incoming working fluid behind the block when the direction of rotation of the engine is reversed, and is held in its end position by the pressure of said fluid on its exposed face so long as the direction of rotation remains unchanged. The disc valve $v$ is angularly adjusted by a spindle $y$ extending through a stuffing box $y^1$ on the end of the valve body $t$ where it is fitted with a handwheel $y^2$. A pin $t^1$ is provided in the valve body which co-acts with a groove $v^3$ in the periphery of the disc valve to limit its angular movement.

The pressure of the working fluid behind the piston $u$ keeps it and the disc valve $v$ tightly sealed against the end plate $g$ of the rotor $a$ without undue friction.

By angularly adjusting the disc valve $v$ through about 120°, the direction of rotation of the rotors $a$, $b$ can be at once reversed.

The axis of the piston $u$ is preferably eccentric in relation to the axis of the disc valve $v$ as shown in Fig. 1 to increase the pressure on the admission side of the latter.

To cut-off fluid pressure from the piston $u$ and disc valve $v$ when the engine is to be reversed, the spindle $y$ is provided with a cylindrical enlargement $z$ having a straight-through port $z^1$, and said spindle is coupled to the disc valve $v$ so that the initial movement of the spindle moves the port $z^1$ beyond the inlet port $w$ and the enlargement thus cuts off the passage of pressure fluid to the space $u^3$ and port $u^1$ of the piston valve. As shown in Fig. 2, the lower end of the spindle $y$ is provided with diametrical projections $y^3$ working in segmental recesses $v^4$ in the disc valve $v$, the angular movement of the spindle $y$ from the position shown necessary to bring the projections $y^3$ against the ends of said recesses being sufficient to move the port $z^1$ clear of the inlet port $w$. Further movement of the spindle $y$ in the same direction moves the disc valve $v$ until it is stopped by the pin $t^1$. In the opposite direction, the initial movement of the spindle before it picks up the valve $v$ again cuts off the inlet port $w$.

Apertures and passages are provided for lubricating the cylinders $k$, pistons $m$, $n$ and disc valve $v$. In the example illustrated, an inlet $j$ is provided in the valve body $t$ leading by a passage $j^1$ to a central port $j^2$ in the end plate $g$ of the rotor $a$. Lubricant supplied to the inlet $j$ thus passes into the central chamber $q$ of the rotor $a$ and by the tube $p$ to the chamber $r$ of the rotor $b$. Ports $q^1$, $r^1$ in the rotors $a$ and $b$ communicate with the chambers $e$ and $f$ in which the cylinders $k$ slide and supply lubricant to said cylinders.

The engine above described and illustrated in Figs. 1, 2 and 3 is primarily intended to be run on steam, but it may be run on compressed air or other pressure fluid, the necessary modifications being illustrated in Figs. 4, 5 and 6. In this example the ends of the piston rods $n^1$ beyond the pistons $n$ within the rotor $b$ are fitted with sparking plugs $m^3$ connected by insulated leads $m^4$ to contacts $m^5$ projecting outwards from the end plate $h$ of said rotor, said contacts co-operating with a stud $h^2$ fitted with a terminal $h^3$ to which a lead $h^4$ from a source of high-tension electricity is attached. The terminal $h^3$ and stud $h^2$ are carried by a handlever $h^5$ pivoted at $h^6$ on a flanged guard plate $h^7$ attached by screws $h^8$ to the bearing-carrying block $d^1$ of the base plate $d$, said lever being movable in a segmental slot $h^9$ in said guard plate to advance or retard the ignition as required. The cylinders $k$ are supplied with compressed air through the ports $w$, $u^1$ and $g^2$, and the passages $m^8$ in the piston rods $m^1$, separated ports $v^5$, $v^6$ being substituted, as shown in Fig. 5, for the segmental port $v^1$ in the disc valve $v$, one or the other of the ports $v^5$, $v^6$, being closed by the piston $u$ according to the direction in which the engine is revolving, the direction being changed by partially rotating the disc valve $v$ by the spindle $y$ as hereinbefore described. Liquid fuel under pressure is also supplied to the cylinders $k$ by passages $w^1$, $u^4$, $g^3$ and $m^6$ adjacent to the ports $w$, $u^1$ and $g^2$ and within the piston rods $m^1$, the passages $m^6$ terminating in jets $m^7$ at the outer ends of said rods. Separated ports $v^7$, $v^8$ are provided in the disc valve $v$ adjacent to ports $v^5$, $v^6$ for controlling the passage of fuel to the ports $g^3$ according to the direction of rotation of the engine, in the same manner as the compressed air is controlled by the ports $v^5$, $v^6$. The products of combustion escape from the cylinders $k$ by the ports $g^2$, the segmental port $v^2$ in the disc valve and the ports $u^2$ and $x$.

In our rotary engine, the working cylinders are located between opposed pistons, and the engine is almost silent during running and practically vibrationless. It can be run at any desired speed up to its maximum and can be reversed at will. It is completely rotary and is without parts which stop and then restart in the reverse direction during each revolution.

If the engine is to be non-reversing, the spindle $y$ and its port $z^1$ are dispensed with.

Where the engine is to serve as an air compressor or pump, rotary power is applied to the shaft $s$ and the fluid to be compressed or pumped is drawn in through the exhaust port $x$ and discharged through the inlet port $w$.

While we have illustrated and described what we at present consider the preferred form of our invention, we wish it to be understood that various changes or modifications of a minor character may be made in the actual machine from that herein disclosed without departing from the spirit of our invention or the scope of the appended claims. For example, the rotors may be provided with any desired number of cylinders from three upwards.

What we claim and desire to secure by Letters Patent is:—

1. A rotary engine comprising two angularly-disposed rotors, supporting means therefor, a shaft attached to one of said rotors, a plurality of angled cylinders connecting said rotors together, means for slidably supporting said cylinders in said rotors, piston rods secured to said rotors projecting into the opposite ends of said angled cylinders, a piston on each of said rods within said cylinders, the working spaces of said cylinders being located between opposed pistons, and means for admitting and discharging fluid to and from said working spaces.

2. A rotary engine comprising two angularly-disposed rotors, supporting means therefor, a shaft attached to one of said rotors, a plurality of angled cylinders connecting said rotors together, parallel chambers corresponding in number to said cylinders spaced around the axis of each of said rotors and receiving the opposite open ends of said cylinders, means for closing the remote ends of said chambers, piston rods secured to said rotors projecting into the opposite ends of said angled cylinders, a piston on each of said rods within said cylinders, the working spaces of said cylinders being located between opposed pistons, and means for admitting and discharging fluid to and from said working spaces comprising passages in the piston rods of one rotor, ports in the closing means for the chambers in said rotor, an apertured disc valve co-acting with said ports, and means for angularly adjusting said disc valve.

3. A rotary engine comprising two angularly-disposed rotors, supporting means therefor, a shaft attached to one of said rotors, a plurality of angled cylinders connecting said rotors together, parallel chambers corresponding in number to said cylinders spaced around the axis of each of said rotors and receiving the opposite open ends of said cylinders, means for closing the remote ends of said chambers, piston rods secured to said rotors projecting into the opposite ends of said angled cylinders, a piston on each of said rods within said cylinders, the working spaces of said cylinders being located between opposed pistons, and means for admitting and discharging fluid to and from said working spaces comprising passages in the piston rods of one rotor, ports in the closing means for the chambers in said rotor, an apertured disc valve co-acting with said ports, a piston bearing on said disc valve, and means for angularly adjusting said disc valve.

4. A rotary engine comprising two angularly-disposed rotors, supporting means therefor, a shaft attached to one of said rotors, a plurality of angle cylinders connecting said rotors together, parallel chambers corresponding in number to said cylinders spaced around the axis of each of said rotors and receiving the opposite open ends of said cylinders, means for closing the remote ends of said chambers, piston rods secured to said rotors projecting into the opposite ends of said angled cylinders, a piston on each of said rods, the working spaces of said cylinders being located between opposed pistons, and means for admitting and discharging fluid to and from said working spaces comprising passages in the piston rods of one rotor, ports in the closing means for the chambers in said rotor, an apertured disc valve co-acting with said ports, a piston bearing on said disc valve, means for angularly adjusting said disc valve, and means for cutting-off said working fluid to said piston before said disc valve is moved.

5. A rotary engine comprising two angularly-disposed rotors, supporting means therefor, a shaft attached to one of said rotors, a plurality of angled cylinders connecting said rotors together, parallel chambers corresponding in number to said cylinders spaced around the axis of each of said rotors and receiving the opposite open ends of said cylinders, means for closing the remote ends of said chambers, piston rods secured to said rotors projecting into the opposite ends of said angled cylinders, a piston on each of said rods within said cylinders, the working spaces of said cylinders being located between opposed pistons, and means for admitting and discharging fluid to and from said working spaces comprising passages in the piston rods of one rotor, ports in the closing means for the chambers in said rotor, an apertured disc valve co-acting with said ports, a piston bearing on said disc valve, means for angularly adjusting said disc valve comprising a spindle, means for angularly adjusting said spindle, a port in said spindle, and means for coupling said spindle to said disc valve permitting initial movement of the spindle before it commences to move said valve.

JOHN GEORGE EDMUNDSON.
JOHN BEAUMONT TAYLOR.